US008341032B2

(12) United States Patent
Michlitsch et al.

(10) Patent No.: US 8,341,032 B2

(45) Date of Patent: Dec. 25, 2012

(54) METHODS FOR TRANSFORMING AN AUCTIONED ITEM OF UNKNOWN VALUE AND BUYER INTO AN AUCTIONED ITEM OF KNOWN VALUE AND BUYER

(76) Inventors: Kenneth J. Michlitsch, Livermore, CA (US); Matthew P. Michlitsch, Torrance, CA (US)

( * ) Notice: Subject to any disclaimer, the term of this patent is extended or adjusted under 35 U.S.C. 154(b) by 264 days.

(21) Appl. No.: 12/815,287

(22) Filed: Jun. 14, 2010

(65) Prior Publication Data

US 2010/0325008 A1 Dec. 23, 2010

Related U.S. Application Data

(60) Provisional application No. 61/218,242, filed on Jun. 18, 2009.

(51) Int. Cl.
*G06Q 30/00* (2012.01)
*G06F 17/30* (2006.01)

(52) U.S. Cl. ...................... 705/26.3; 705/26.1; 705/27.1

(58) Field of Classification Search ......... 705/26.1–27.2
See application file for complete search history.

(56) References Cited

U.S. PATENT DOCUMENTS

| | | | | |
|---|---|---|---|---|
| 5,960,411 | A | 9/1999 | Hartman et al. | |
| 6,871,190 | B1 * | 3/2005 | Seymour et al. | 705/37 |
| 7,493,280 | B2 * | 2/2009 | Guler et al. | 705/37 |
| 7,853,486 | B2 * | 12/2010 | Grove et al. | 705/26.3 |
| 2003/0093357 | A1 * | 5/2003 | Guler et al. | 705/37 |
| 2004/0019531 | A1 * | 1/2004 | Broussard et al. | 705/26 |
| 2004/0098332 | A1 * | 5/2004 | Dvir | 705/37 |
| 2005/0091144 | A1 * | 4/2005 | Longman et al. | 705/37 |
| 2005/0114225 | A1 * | 5/2005 | Longman et al. | 705/26 |
| 2005/0273417 | A1 * | 12/2005 | Budish | 705/37 |
| 2005/0289043 | A1 * | 12/2005 | Maudlin | 705/37 |
| 2006/0190387 | A1 * | 8/2006 | Molloy | 705/37 |
| 2007/0022042 | A1 * | 1/2007 | Nishi | 705/37 |
| 2007/0130054 | A1 * | 6/2007 | Jenniges et al. | 705/37 |
| 2007/0208656 | A1 * | 9/2007 | Feaver et al. | 705/37 |
| 2007/0226118 | A1 * | 9/2007 | Gill | 705/37 |
| 2008/0126242 | A1 * | 5/2008 | Banbury et al. | 705/37 |

(Continued)

OTHER PUBLICATIONS

"Public Versus Secret Reserve Prices in Ebay Auctions: Results from a Pokemon field experiment." Katkar and Lucking-Reiley. Working Paper 8183, National Bureau of Economic Research, Mar. 2001. [Recovered from Google on Apr. 27, 2012].*

(Continued)

*Primary Examiner* — Peter Choi
*Assistant Examiner* — Kathleen G Palavecino

(57) ABSTRACT

Methods, including methods conducted with a computer system and/or over a telecommunications network, are provided for transforming an auctioned item of unknown value and buyer into an auctioned item of known value and buyer. The methods comprise sealed bid, second-best price auctions that diminish the effects of information asymmetry while aligning the interests of buyers and sellers by reducing common auction risks of the winner's curse, buyer's remorse, bid shading, shill bidding, bid sniping, and/or collusion. Bidders submit sealed bids for the auctioned item. At a successful auction's conclusion, a highest bidder is established as the item's buyer and a second-best price is established as the value. This second-best price is the second highest sealed bid obtained, or a reserve price that the highest bidder accepts as the value for the auctioned item when the highest sealed bid is the only sealed bid at least equal to the reserve price. The second-best price optionally may be one bid increment more than the second highest sealed bid or the reserve price.

20 Claims, 10 Drawing Sheets

U.S. PATENT DOCUMENTS

| | | | | |
|---|---|---|---|---|
| 2009/0112751 | A1 * | 4/2009 | Miller et al. | 705/37 |
| 2009/0119134 | A1 * | 5/2009 | Sakaue et al. | 705/4 |
| 2009/0248563 | A1 * | 10/2009 | Deasy et al. | 705/37 |
| 2010/0082446 | A1 * | 4/2010 | Hjelm et al. | 705/26 |
| 2010/0274680 | A1 * | 10/2010 | Carlson et al. | 705/26 |

OTHER PUBLICATIONS

Vickrey, W. "Counterspeculation, Auctions, and Competitive Sealed Tenders," Journal of Finance, vol. 16, Issue 1, Mar. 1961, American Finance Association 1961, pp. 8-37.

Klemperer, P., "What Really Matters in Auction Design," Journal of Economic Perspectives, vol. 16, No. 1, Winter 2002, American Economic Association, pp. 169-189.

Lucking-Reily, D., "Vickrey Auctions in Practice: From Nineteenth-Century Philately to Twenty-First Century E-Commerce,"Journal of Economic Perspectives, Summer 2000, vol. 14, No. 3, American Economic Association, pp. 183-192.

Lucking-Reily, D., "Auctions on the Internet: What's Being Auctioned, and How?,"Journal of Industrial Economics, Sep. 2000, vol. 48. No. 3, Blackwell Publishing Ltd., pp. 227-252.

Ockenfels, A. et al., "Online Auctions," Handbook of Information Systems and Economics, 2007, Elsevier Science, pp. 571-628.

* cited by examiner

METHODS FOR TRANSFORMING AN AUCTIONED ITEM OF UNKNOWN VALUE AND BUYER INTO AN AUCTIONED ITEM OF KNOWN VALUE AND BUYER

REFERENCE TO RELATED APPLICATIONS

The present application claims the benefit of U.S. Provisional Patent Application Ser. No. 61/218,242, filed on Jun. 18, 2009, which is incorporated herein by reference in its entirety.

INCORPORATION BY REFERENCE

All publications and patent applications mentioned in this specification are herein incorporated by reference to the same extent as if each individual publication or patent application was specifically and individually indicated to be incorporated by reference.

TECHNICAL FIELD

The present invention relates to methods for transforming an auctioned item of unknown value and buyer into an auctioned item of known value and buyer. More particularly, the present invention relates to methods for transforming an auctioned item of unknown value and buyer into an auctioned item of known value and buyer via sealed bid, second-best price auction formats that align the interests of buyers and sellers.

BACKGROUND

In any auction, different bidders may have different amounts of information regarding an auctioned item of unknown value. This is known as information asymmetry and often leads to different estimates of fair value for the auctioned item. For example, a car dealer likely would estimate more accurately the fair value of an auctioned car than would a jeweler, while the jeweler likely would estimate more accurately the fair value of auctioned jewelry than would the car dealer. Thus, were the jeweler and the car dealer to bid against one another in an auction for a car or for jewelry, information asymmetry likely would exist.

Where information asymmetry exists in some auction formats, bidders need to worry about the winner's curse, which is the tendency for a bidder with less information to bid too much and overpay for the auctioned item. As a bidder, such overbidding clearly is undesirable and can lead to buyer's remorse, or regret for having participated in the auction and having won the auctioned item. This may reduce the likelihood of the bidder participating in future auctions and/or may lead to bid shading (underbidding).

Since many bidders are implicitly or explicitly familiar with the winner's curse, in order to ensure that they do not overbid for an auctioned item, these "savvy" bidders may reduce, or shade, their bids to ensure that they don't overpay when participating in some auction formats. Worse yet, these savvy bidders might decide not to bid at all. Thus, as bidders with less information seek to avoid the winner's curse, sellers need to worry about receiving less than fair value for their auctioned items due to bid shading and/or due to prospective bidders deciding not to bid at all.

Sellers also must worry about collusion, or improper side agreements, among bidders that reduce the amounts bid. Bidders might, for example, improperly decide amongst themselves whom to let win an auction and at what price. The bidders also might, for example, signal through their bidding patterns what they are willing to bid and/or might punish those that bid against them in future auctions.

Sellers aren't the only ones that must worry about collusion. Bidders must worry about collusion between sellers and false, or shill, bidder(s), that drop out of an auction after stimulating additional bidding and driving up the high bid for an auctioned item. The risk of collusion is greater in auction formats where bidders and their bids are publicly disclosed during the auction.

When bids are publicly disclosed, another risk for both bidders and sellers is the risk of bid sniping, wherein a bid sniper enters a high bid just before the conclusion of the auction, such that there is no time for other bidders to enter higher counterbids. In some circumstances, this may allow the bid sniper to win the auction with a bid that is below the reservation price (i.e., the highest amount a given bidder would be willing to pay for the auctioned item) of one or more other bidders. Thus, bid sniping may produce a buyer whose bid is below what one or more other bidders would be willing to pay, may discourage prospective bidders from participating in the auction, and/or may provide the seller with less than fair value for the auctioned item.

Auctions often are performed over a telecommunications network, such as the Internet, using computer systems. As described, for example, in U.S. Pat. No. 5,960,411 to Hartman, et al., which is incorporated herein by reference in its entirety:

> "The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that effects the requesting of Web pages and the displaying of Web pages.

> "Currently, Web pages are typically defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems."

In addition to HTML, web browsers on client computer systems (also known as "client-side" systems) may run other languages that enable more dynamic content, e.g. scripting languages, such as JavaScript, Extensible Markup Language ("XML"), a combination of the two known as Asynchronous JavaScript and XML (commonly referred to as "AJAX"), VBScript and Cascading Style Sheets ("CSS"). Client-side scripts may, for example, be embedded in an HTML document or may be in a separate file that is referenced by an HTML document. Client-side scripts are run locally by the client computer system. Web-enabled applications on a client computer system also may bypass web browsers and run as stand-alone Rich Internet Applications.

Server computer systems (also known as "server-side" systems) commonly run server-side scripts, written in languages such as Perl, PHP, ASP.Net and VBScript, that may, for example, be executed when a client computer system requests a document from the server computer system. Server-side scripts often retrieve information from, and/or modify information stored within, a database accessible via the server computer system. A common web application database system is the Relational Database Management System ("RDMS"). MySQL is an example of a RDMS.

As with some auction formats conducted by other means, auction formats conducted over telecommunications networks such as the Internet may be prone to information asymmetry, the winner's curse, buyer's remorse, bid shading, bid sniping, shill bidding and/or collusion. The perceived or actual relative anonymity provided by the Internet may increase collusion risks, especially in auction formats where bidders and their bids are publicly disclosed during the auction. Collusion may be conducted via bidder signaling in the publicly disclosed bids, or via bidders contacting one another during the auction but outside of the auction framework in order to arrange a collusive side agreement. Furthermore, publicly disclosed bids increase a risk of seller-instigated collusion, e.g., via shill bidder(s) that drop out of an auction after stimulating additional bidding and driving up the high bid for an auctioned item.

In view of the foregoing, it would be desirable to provide methods for establishing a value and a buyer for an auctioned item of unknown value that seek to diminish the corrosive effects of information asymmetry and align the interests of buyers and sellers by reducing the risks of the winner's curse, buyer's remorse, bid shading, bid sniping, shill bidding and/or collusion.

It would be desirable to establish a value and a buyer for an auctioned item of unknown value via computer-based methods that seek to diminish the corrosive effects of information asymmetry and align the interests of buyers and sellers by reducing the risks of the winner's curse, buyer's remorse, bid shading, bid sniping, shill bidding and/or collusion.

SUMMARY

The present invention relates to methods for transforming an auctioned item of unknown value and buyer into an auctioned item of known value and buyer. More particularly, the present invention relates to methods for transforming an auctioned item of unknown value and buyer into an auctioned item of known value and buyer via sealed bid, second-best price auction formats that diminish the corrosive effects of information asymmetry and align the interests of buyers and sellers by reducing common auction risks of the winner's curse, buyer's remorse, bid shading, bid sniping, shill bidding and/or collusion. In one embodiment, a computer-based sealed bid, second-best price auction format is implemented over a telecommunications network, such as the Internet, a public telecommunications network, a private telecommunications network, and/or a Virtual private Network (VPN).

Auction formats in accordance with the present invention, collectively known as SealedSecond™ auctions, comprise bidders submitting sealed bids for an auctioned item of unknown value. The sealed bids are not revealed for the duration of the auction. At the conclusion of a successful SealedSecond™ auction, the high bidder is established as the buyer for the auctioned item. The buyer only pays the second-best price, which is established as the value for the auctioned item. In this manner, an auctioned item of unknown value is transformed into an auctioned item of known value and buyer.

In one embodiment of the present invention, when the auctioned item has received multiple sealed bids at least equal to the item's reserve price (i.e., the minimum amount that the seller is willing to accept for the auctioned item), the second highest sealed bid entered during the SealedSecond™ auction is established as the second-best price and, thus, is established as the value of the auctioned item. Optionally, the second-best price and the value may be established as one bid increment above the second highest sealed bid in such an embodiment.

In one embodiment, when only the highest sealed bid is at least equal to the auctioned item's reserve price, if the highest bidder accepts the reserve price (or, optionally, one bid increment more than the reserve price) as the value of the auctioned item in such a circumstance, the reserve price is established as the second-best price and as the value of the auctioned item. Optionally, the second-best price and the value may be established as one bid increment more than the reserve price in such a circumstance of the embodiment. If the highest bidder does not accept the reserve price (or, optionally, one bid increment more than the reserve price) as the value when only the highest sealed bid is at least equal to the auctioned item's reserve price, the auction terminates without establishment of the value or the buyer.

In one embodiment, when multiple independent bidders enter the highest sealed bid that is at least equal to the reserve price, a first bidder to have entered the highest sealed bid is established as the buyer, and the highest sealed bid is established as the second-best price and the value. Optionally, the second-best price and the value may be established as one bid increment above the highest sealed bid in such an embodiment.

In one embodiment, when no sealed bids are at least equal to the reserve price, the auction terminates without establishment of the value and the buyer.

For bidders, the high bidder's payment of the second-best price rather than the highest sealed bid entered in the SealedSecond™ auction advantageously diminishes a risk of overpayment commonly known as the winner's curse, which is inherent in some other auction formats. The winner's curse can induce buyer's remorse, or regret by the high bidder for having bid so much and/or for having participated in the auction.

For sellers, the high bidder's payment of the second-best price rather than the highest sealed bid advantageously diminishes a risk of bid shading (underbidding) by bidders, as well as a risk of prospective bidders deciding not to bid at all, as the bidders seek to avoid the winner's curse. The bidder anonymity provided by the sealed bid format of SealedSecond™ auctions also reduces a risk of side agreements, or collusion, among bidders, which can lead to improperly low winning bids for auctioned items. Furthermore, sealed bidding reduces a risk of bid sniping, which may yield a buyer whose high bid is below what one or more other bidders would be willing to pay, may discourage prospective bidders from participating in the auction, and/or may provide the seller with less than fair value for the auctioned item.

By reducing the bidders' risk of overpayment via second-best pricing, while also diminishing the risks of collusion and bid sniping through sealed bidding, SealedSecond™ auctions motivate bidders to bid their full estimates for an auctioned item's true worth, thereby providing sellers with a fair value for the auctioned item. Additionally, by setting the reserve price, sellers are able to ensure that a minimally acceptable value is established before selling the auctioned item.

As mentioned previously, in SealedSecond™ auctions it may be determined whether the high bidder would accept the reserve price (or, optionally, a bid increment more than the reserve price) as the value of the auctioned item, if, at the conclusion of the SealedSecond™ auction, that bidder is the only bidder to have entered a sealed bid at least equal to the reserve price. For bidders/buyers, this determination advantageously provides choice as to whether they are willing to accept the reserve price as the value of the auctioned item when there is no second highest sealed bid at least equal to the reserve price. For sellers, this determination advantageously establishes the buyer and the value of the auctioned item in a subset of the auctions where only the highest sealed bid is at least equal to the reserve price.

A SealedSecond™ auction begins when a seller puts an auctioned item up for auction using a SealedSecond™ auction format. The seller provides descriptive information about the auctioned item and sets a reserve price for the auctioned item. The reserve price may be public or private and is the minimum amount that the seller is willing to accept for the auctioned item. The seller may set the reserve price to zero for a no reserve auction. Optionally, the seller may specify the duration of the SealedSecond™ auction, a private or publicly disclosed minimum bid, and/or a bid increment. Alternatively, the duration, the minimum bid and/or the bid increment may be specified by pre-determined rules of the auction.

Once the seller has initiated the SealedSecond™ auction, bidders may submit sealed bids for the auctioned item at any time for the duration of the SealedSecond™ auction. If a minimum bid has been set for the auctioned item, only sealed bids above that minimum bid are accepted and entered. Bidders and their sealed bids are revealed neither to the seller nor to other bidders during the SealedSecond™ auction. In one embodiment, when entering a sealed bid, each bidder elects whether to purchase the auctioned item at the reserve price (or, optionally, a bid increment above the reserve price), if, at the conclusion of the SealedSecond™ auction, that bidder is the only bidder to have entered a sealed bid that is at least equal to the reserve price.

When a sealed bid is entered, the bidder optionally is privately informed whether the sealed bid has met the reserve price for the auctioned item. In one embodiment, bidders are not informed during the auction whether any other bidders have met the reserve price. Each bidder preferably has the option to increase that bidder's sealed bid at any time for the duration of the SealedSecond™ auction. Once entered, sealed bids preferably cannot be reduced or withdrawn.

At the conclusion of a SealedSecond™ auction in which multiple sealed bids have met the reserve price, the high bidder with the highest sealed bid is established as the buyer that wins the auction, but that high bidder only pays the second-best price for the auctioned item (the second highest sealed bid received for the auctioned item during the SealedSecond™ auction, or, optionally, one bid increment more than the second highest sealed bid), which is established as the value of the auctioned item. In the event that two or more unique bidders have independently entered the highest sealed bid, the first bidder to have entered the highest sealed bid wins the auction and pays the highest sealed bid (or, optionally, one bid increment more than the highest sealed bid).

At the conclusion of a SealedSecond™ auction in which the highest sealed bid is the only sealed bid at least equal to the auctioned item's reserve price, if it is determined that the high bidder accepts the reserve price (or, optionally, one bid increment above the reserve price) as the value for the auctioned item in such a circumstance, the high bidder purchases the auctioned item at the reserve price (or, optionally, one bid increment above the reserve price). Alternatively, if it is determined that the high bidder does not accept the reserve price as the value in such a circumstance, the auction ends without a sale of the auctioned item. Likewise, if no sealed bids are at least equal to the reserve price, the auction terminates without a sale.

At the conclusion of a SealedSecond™ auction, the buyer and the value for the auctioned item preferably are publicly disclosed. If the second highest sealed bid (or one bid increment more than the second highest sealed bid) is established as the value, the second highest bidder having entered the second highest sealed bid optionally also may be publicly disclosed at the conclusion of the auction. If the reserve price (or, optionally, one bid increment above the reserve price) is established as the value, the reserve price optionally may be publicly disclosed at the conclusion of the auction. The highest sealed bid also optionally may be disclosed at the conclusion of the auction. All bidders and their sealed bids, or any subset thereof, optionally may be disclosed at the conclusion of the auction.

The number of bidders having entered sealed bids during a SealedSecond™ auction optionally may be publicly disclosed during or after completion of the auction. In one SealedSecond™ auction embodiment, the seller optionally may specify a private or publicly disclosed minimum number of bidders required for successful completion of the auction. The minimum number of bidders may be publicly disclosed during or after the auction, or may be kept private. Furthermore, whether the minimum number of bidders has been met may be publicly disclosed during the auction, or may be kept private.

SealedSecond™ auctions may be conducted via one or more computers. In one embodiment a server computer system communicates via a telecommunications network with one or more client computer systems. The server computer system may comprise a database and a server engine with instructions for conducting the SealedSecond™ auction, including accessing and altering the database. Bidders enter their sealed bids and communicate with the server computer system via client computer systems. The server computer system conducts the auction and establishes the buyer and the value of the auctioned item at the conclusion of the auction in accordance with the instructions. The instructions may comprise, for example, one or more server-side scripts.

BRIEF DESCRIPTION OF THE DRAWINGS

Several embodiments of the present invention will be apparent upon consideration of the following detailed description, taken in conjunction with the accompanying drawings, in which like reference characters refer to like parts throughout, and in which.

DETAILED DESCRIPTION

Figure 1A:
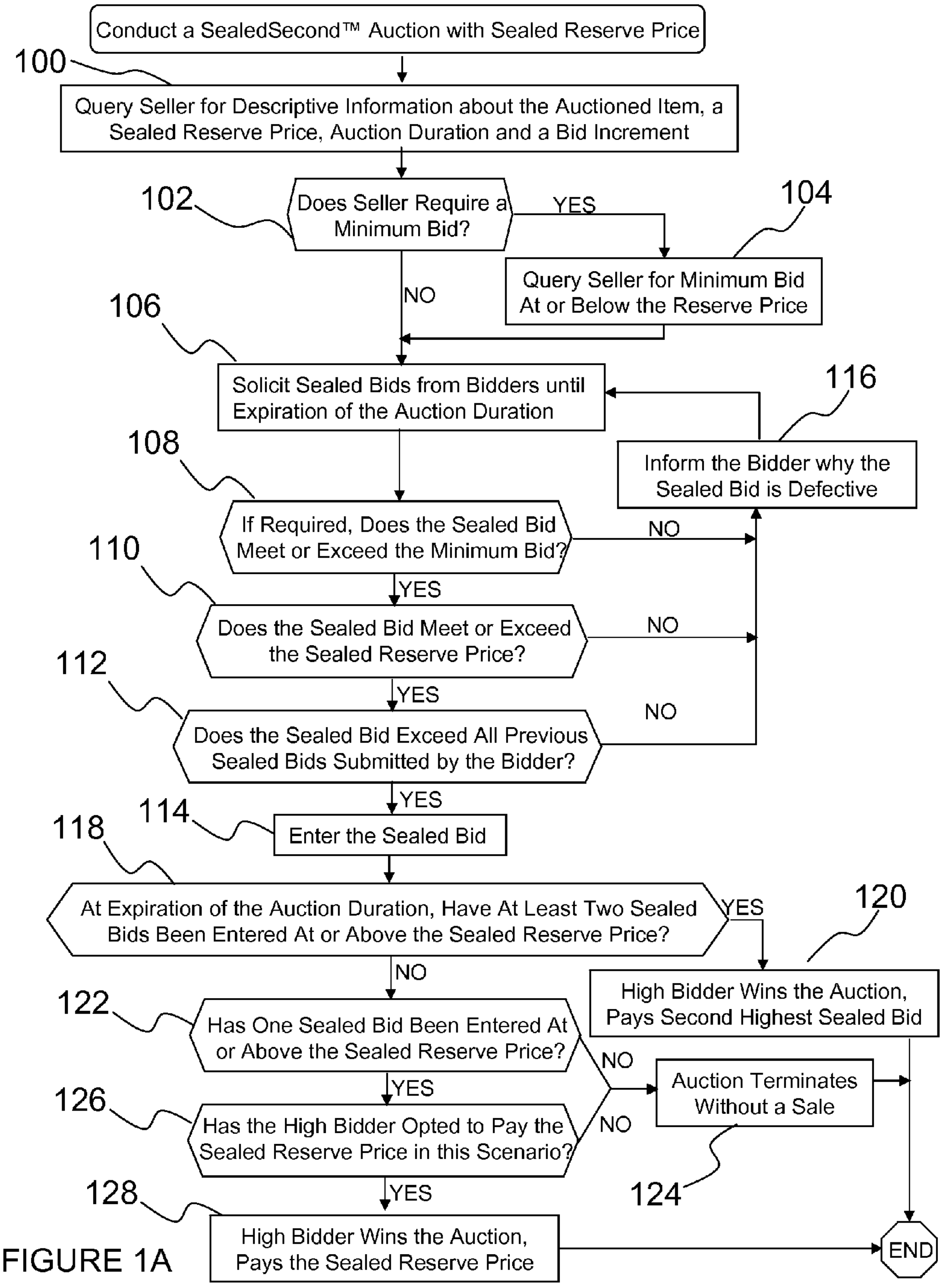
FIGS. 1A and 1B are schematic views illustrating methods for establishing the value and the buyer for an auctioned item of unknown value via a SealedSecond™ auction having a sealed reserve price.

The present invention relates to methods for transforming an auctioned item of unknown value and buyer into an auctioned item of known value and buyer. More particularly, the present invention relates to methods for transforming an auctioned item of unknown value and buyer into an auctioned item of known value and buyer via sealed bid, second-best price auction formats that diminish the corrosive effects of information asymmetry and align the interests of buyers and sellers by reducing common auction risks of the winner's curse, buyer's remorse, bid shading, bid sniping, shill bidding and/or collusion. In one embodiment, a computer-based sealed bid, second-best price auction format is implemented over a telecommunications network, such as the Internet, a public telecommunications network, a private telecommunications network, and/or a Virtual private Network (VPN).

Auction formats in accordance with the present invention, collectively known as SealedSecond™ auctions, comprise bidders submitting sealed bids for an auctioned item of unknown value. The sealed bids are not revealed for the duration of the auction. At the conclusion of a successful SealedSecond™ auction, the high bidder is established as the buyer for the auctioned item. The buyer only pays the second-best price, which is established as the value for the auctioned item. In this manner, an auctioned item of unknown value is transformed into an auctioned item of known value and buyer.

In one embodiment of the present invention, when the auctioned item has received multiple sealed bids at least equal to the item's reserve price (i.e., the minimum amount that the seller is willing to accept for the auctioned item), the second highest sealed bid entered during the SealedSecond™ auction is established as the second-best price and, thus, is established as the value of the auctioned item. Optionally, the second-best price and the value of the auctioned item may be established as one bid increment above the second highest sealed bid in such an embodiment.

In one embodiment, when only the highest sealed bid is at least equal to the auctioned item's reserve price, if the highest bidder accepts the reserve price (or, optionally, one bid increment more than the reserve price) as the value of the auctioned item in such a circumstance, the reserve price is established as the second-best price and as the value of the auctioned item. Optionally, the second-best price and the value may be established as one bid increment more than the reserve price in such a circumstance of the embodiment. If the highest bidder does not accept the reserve price (or, optionally, one bid increment more than the reserve price) as the value when only the highest sealed bid is at least equal to the auctioned item's reserve price, the auction terminates without establishment of the value or the buyer.

In one embodiment, when multiple independent bidders enter the highest sealed bid that is at least equal to the reserve price, a first bidder to have entered the highest sealed bid is established as the buyer, and the highest sealed bid is established as the second-best price and the value. Optionally, the second-best price and the value may be established as one bid increment above the highest sealed bid in such an embodiment.

In one embodiment, when no sealed bids are at least equal to the reserve price, the auction terminates without establishment of the value and the buyer.

For bidders, the high bidder's payment of the second-best price rather than the highest sealed bid entered in the SealedSecond™ auction advantageously diminishes a risk of overpayment commonly known as the winner's curse, which is inherent in some other auction formats. The winner's curse can induce buyer's remorse, or regret by the high bidder for having bid so much and/or for having participated in the auction.

For sellers, the high bidder's payment of the second-best price rather than the highest sealed bid advantageously diminishes a risk of bid shading (underbidding) by bidders, as well as a risk of prospective bidders deciding not to bid at all, as the bidders seek to avoid the winner's curse. The bidder anonymity provided by the sealed bid format of SealedSecond™ auctions also reduces a risk of side agreements, or collusion, among bidders, which can lead to improperly low winning bids for auctioned items. Furthermore, sealed bidding reduces a risk of bid sniping, which may yield a buyer whose high bid is below what one or more other bidders would be willing to pay, may discourage prospective bidders from participating in the auction, and/or may provide the seller with less than fair value for the auctioned item.

By reducing the bidders' risk of overpayment via second-best pricing, while also diminishing the risks of collusion and bid sniping through sealed bidding, SealedSecond™ auctions motivate bidders to bid their full estimates for an auctioned item's true worth, thereby providing sellers with a fair value for the auctioned item. Additionally, by setting the reserve price, sellers are able to ensure that a minimally acceptable value is established before selling the auctioned item.

As mentioned previously, in SealedSecond™ auctions it may be determined whether the high bidder would accept the reserve price (or, optionally, a bid increment more than the reserve price) as the value of the auctioned item, if, at the conclusion of the SealedSecond™ auction, that bidder is the only bidder to have entered a sealed bid at least equal to the reserve price. For bidders/buyers, this determination advantageously provides choice as to whether they are willing to accept the reserve price as the value of the auctioned item when there is no second highest sealed bid at least equal to the reserve price. For sellers, this determination advantageously establishes the buyer and the value of the auctioned item in a subset of the auctions where only the highest sealed bid is at least equal to the reserve price.

A SealedSecond™ auction begins when a seller puts an auctioned item up for auction using a SealedSecond™ auction format. FIG. 1 describe methods for establishing the value and the buyer for an auctioned item of unknown value via embodiments of a SealedSecond™ auction with a sealed reserve price. As seen in Step 100 of FIG. 1A, the seller is queried for descriptive information about the auctioned item and sets a sealed reserve price for the auctioned item. The reserve price is the minimum amount that the seller is willing to accept for the auctioned item. The seller optionally also may determine the duration of the SealedSecond™ auction and/or the bid increment. A default auction duration and/or bid increment alternatively may be established.

Step 102 determines whether the seller requires a minimum bid. SealedSecond™ auctions alternatively may be conducted without allowing the seller to set a minimum bid or with a default minimum bid. If the seller requires a minimum bid, the seller provides the required minimum bid, as in Step 104. The minimum bid must not be greater than the sealed reserve price. The minimum bid preferably is publicly disclosed, but optionally may be kept private.

After requisite information has been obtained from the seller, sealed bids are solicited from bidders for the duration of the auction, as in Step 106. Bidders and their sealed bids preferably are revealed neither to the seller nor to other bidders during the SealedSecond™ auction. When a sealed bid is entered, the bidder optionally is privately notified or informed whether the sealed bid has met the sealed reserve price for the auctioned item. In one embodiment, bidders are not informed during the auction whether any other bidders have met the reserve price. In another embodiment, bidders and prospective bidders are informed whether one, and/or whether at least two, bidders have submitted sealed bids at least equal to the sealed reserve price. Each bidder preferably has the option to increase that bidder's sealed bid at any time for the duration of the SealedSecond™ auction. Once entered, sealed bids preferably cannot be reduced or withdrawn.

When a bidder submits a sealed bid, a series of checks are conducted to determine whether the sealed bid is valid and will be entered. In Step 108, if a minimum bid has been specified, it is determined whether the bidder's sealed bid is at least equal to the minimum bid. In Step 110, it is determined whether the sealed bid is at least equal to the sealed reserve price. In Step 112, it is determined whether the sealed bid exceeds all previous sealed bids submitted by the bidder.

If a sealed bid passes all the checks of Steps 108-112 (i.e., the sealed bid is at least equal to the optional minimum bid and to the sealed reserve price, and the sealed bid exceeds all previous sealed bids submitted by the bidder), then the sealed bid is entered, as in Step 114. If, however, the sealed bid fails at least one of the checks of Steps 108-112, the sealed bid is not entered and the bidder optionally is informed why the sealed bid is defective, as in Step 116.

In one embodiment, sealed bids that pass the checks of Steps 108 and 112, but that fail the check of Step 110 (i.e., sealed bids that are at least equal to the minimum bid, if required, and that exceed all previous sealed bids submitted by the bidder, but that are below the sealed reserve price), may be entered in Step 114. In such an embodiment, bidders optionally are not informed when their sealed bids have met the sealed reserve price.

At expiration of the auction duration, it is determined in Step 118 whether at least two sealed bids have been entered that are at least equal to the sealed reserve price. If yes, then in Step 120 a high bidder having entered a highest sealed bid is established as the buyer of the auctioned item and wins the auction. The value of the auctioned item is established in Step 120 as the second highest sealed bid, which is the price paid by the buyer for the auctioned item. Optionally, Step 120 may be modified such that the value of the auctioned item is established as one bid increment more than the second highest sealed bid. In this manner, an auctioned item of unknown value is transformed into an auctioned item of known value and buyer.

In the event that at least two unique bidders have independently entered the highest sealed bid at least equal to the sealed reserve price, the first high bidder to have entered the highest sealed bid is established as the buyer that wins the auctioned item in Step 120. This first high bidder/buyer pays the highest sealed bid (or, optionally, one bid increment more than the highest sealed bid) for the auctioned item, which is established as the auctioned item's value in Step 120. The highest sealed bid (or, optionally, one bid increment more than the highest sealed bid) is established as the value of the auctioned item in this scenario since the highest sealed bid is both the best price and the second-best price submitted for the auctioned item during the SealedSecond™ auction.

If, in Step 118, it is determined that at least two sealed bids at least equal the sealed reserve price have not been entered, then it is determined whether one sealed bid at least equal to the sealed reserve price has been entered, as in Step 122. If no, the auction terminates without a sale, as in Step 124. If yes, it is determined whether the high bidder (the only bidder having entered a sealed bid at least equal to the sealed reserve price) has opted to pay the sealed reserve price (or, optionally, one bid increment more than the sealed reserve price) in this scenario, as in Step 126. If no, the auction terminates without a sale, as in Step 124. If yes, the high bidder is established as the buyer of the auctioned item that wins the auction, and the value of the auctioned item is established as the sealed reserve price, as in Step 128. Optionally, Step 128 may be modified such that the value of the auctioned item is established as one bid increment more than the sealed reserve price. In this manner, an auctioned item of unknown value is transformed into an auctioned item of known value and buyer.

In Step 126, the high bidder's decision whether to accept the sealed reserve price (or, optionally, one bid increment more than the sealed reserve price) as the value of the auctioned item when the high bidder is the only bidder to have entered a sealed bid at least equal to the sealed reserve price advantageously provides the high bidder with choice as to whether the high bidder is willing to accept the sealed reserve price (or, optionally, one bid increment more than the sealed reserve price) as the value of the auctioned item when there is no second highest sealed bid at least equal to the sealed reserve price. For sellers, this determination advantageously establishes the buyer and the value of the auctioned item in a subset of auctions where only the highest sealed bid is at least equal to the reserve price.

The high bidder's decision whether to accept the sealed reserve price (or, optionally, one bid increment more than the sealed reserve price) as the value in that scenario may comprise opting in, opting out or being informed. Opting in may comprise informed consent, i.e., having the high bidder actively accept the sealed reserve price (or, optionally, one bid increment more than the sealed reserve price) as the value in that scenario. Opting out may comprise having acceptance of the sealed reserve price (or, optionally, one bid increment more than the sealed reserve price) as the value in that scenario be a default condition, and having the high bidder actively disagree with that default condition if the high bidder would not be accepting of the sealed reserve price (or, optionally, one bid increment more than the sealed reserve price) as the value in that scenario. Being informed may comprise informing the high bidder prior to, or during, bidding that the sealed reserve price (or, optionally, one bid increment more than the sealed reserve price) would be the value in that scenario, and construing the high bidder's continued participation in the auction as consent to the sealed reserve price (or, optionally, one bid increment more than the sealed reserve price) being the value in that scenario.

The high bidder's decision may be determined at the time of entry of the high bidder's highest sealed bid (i.e., during the auction at the time of bidding), or may be determined at expiration of the auction duration in the circumstance where the high bidder is the only high bid at least equal to the sealed reserve price. In one embodiment, when the high bidder's decision is determined at the time of bidding, the decision may be determined for any bidder whose sealed bid is the highest sealed bid at the time when that bidder's sealed bid is entered (i.e., including for bidders that are the high bidder for a period of time during the auction duration, but that are no longer the high bidder at expiration of the auction duration). In one embodiment, when the high bidder's decision is determined at the time of bidding, the decision may be determined for all bidders at the time of bidding. In one embodiment, when the high bidder's decision is determined at the time of bidding, the decision may be determined for all bidders at the time of bidding until at least one sealed bid at least equal to the sealed reserve price has been entered.

Figure 1B:
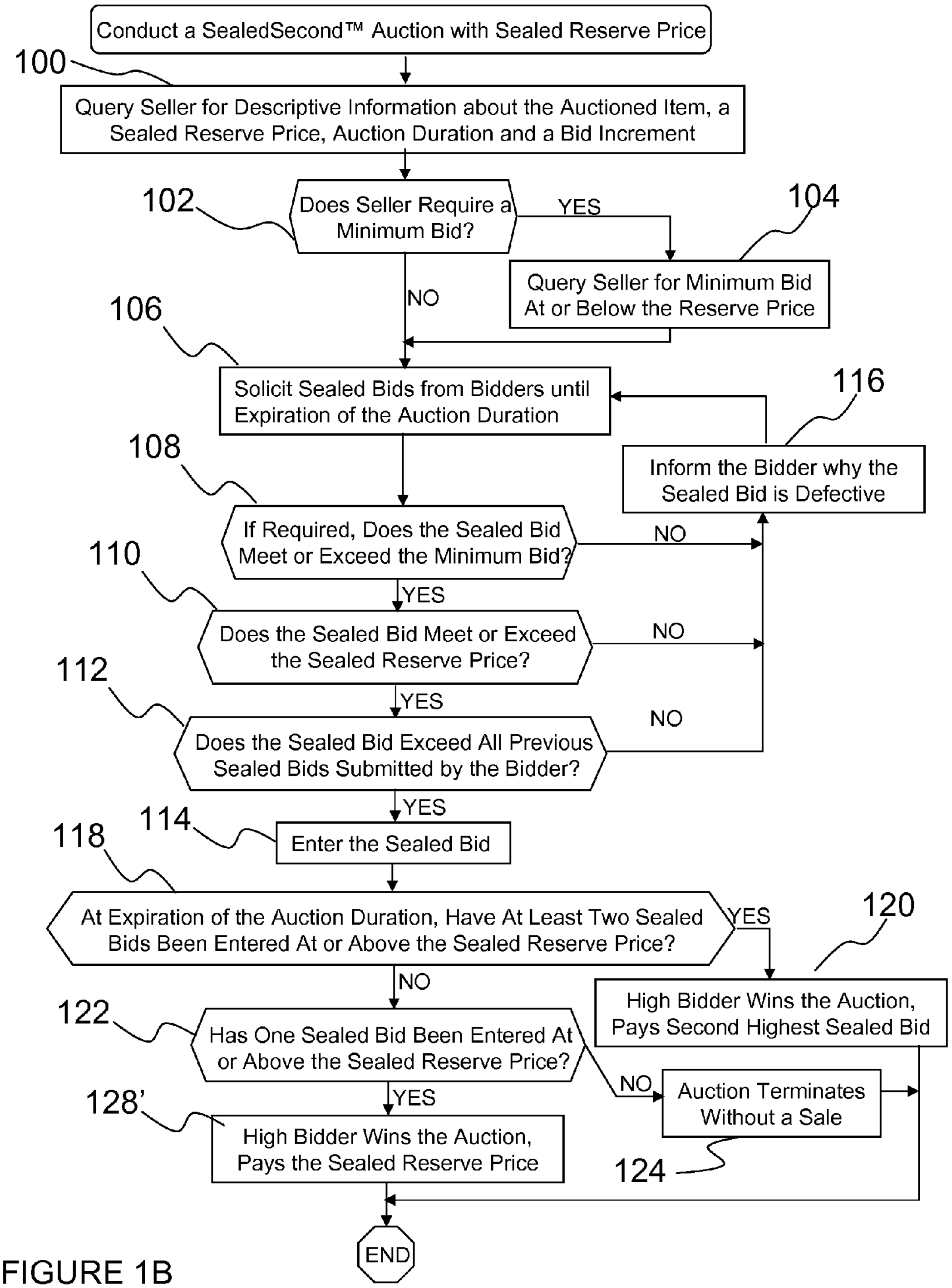

Referring now to FIG. 1B, an alternative embodiment of the SealedSecond™ auction methods of FIG. 1A is provided. In FIG. 1B, Step 126 is omitted. In the scenario where only one sealed bid is entered during the auction that is at least equal to the sealed reserve price, the sealed reserve price is automatically established as the value of the auctioned item in Step 128' without actively determining whether the high bidder established as the buyer would accept the sealed reserve price as the value in that scenario. Optionally, Step 128' may be modified such that the value of the auctioned item is automatically established as one bid increment more than the sealed reserve price. Preferably, the high bidder is informed that the sealed reserve price (or, optionally, one bid increment more than the sealed reserve price) would be the value in that scenario prior to, or during, bidding; the high bidder's continued participation in the auction after being informed may be construed as consent to the sealed reserve price (or, optionally, one bid increment more than the sealed reserve price) being the value in that scenario.

Figure 2A:
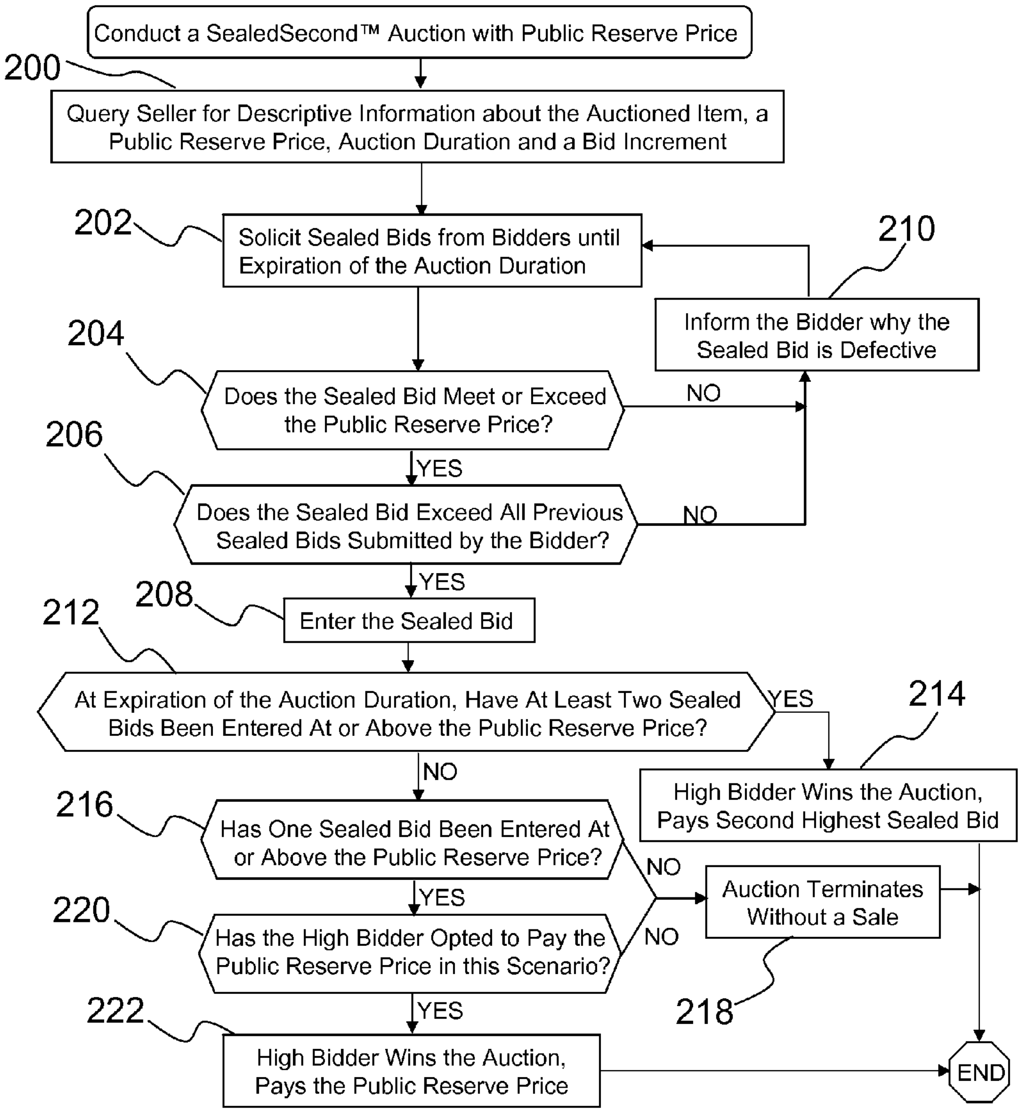
FIGS. 2A and 2B are schematic views illustrating methods for establishing the value and the buyer for an auctioned item of unknown value via a SealedSecond™ auction having a public reserve price.

With reference to FIG. 2, methods for establishing the value and the buyer for an auctioned item of unknown value via embodiments of a SealedSecond™ auction having a public reserve price are described. As seen in Step 200 of FIG. 2A, the seller is queried for descriptive information about the auctioned item and sets a public reserve price for the auctioned item. The public reserve price is the minimum amount that the seller is willing to accept for the auctioned item. The seller optionally also may determine the duration of the SealedSecond™ auction and/or the bid increment. A default auction duration and/or bid increment alternatively may be established. Since the reserve price is public, the seller preferably does not have the option of setting a minimum bid below the public reserve price, as in FIG. 1.

After requisite information has been obtained from the seller, sealed bids are solicited from bidders for the duration of the auction, as in Step 202. Bidders and their sealed bids preferably are revealed neither to the seller nor to other bidders during the SealedSecond™ auction. In one embodiment, bidders are not informed during the auction whether any other bidders have met the public reserve price. In another embodiment, bidders and prospective bidders are informed whether one, and/or whether at least two, bidders have submitted sealed bids at least equal to the public reserve price. Each bidder preferably has the option to increase that bidder's sealed bid at any time for the duration of the SealedSecond™ auction. Once entered, sealed bids preferably cannot be reduced or withdrawn.

When a bidder submits a sealed bid, a series of checks are conducted to determine whether the sealed bid is valid and will be entered. In Step 204, it is determined whether the sealed bid is at least equal to the public reserve price. In Step 206, it is determined whether the sealed bid exceeds all previous sealed bids submitted by the bidder.

If a sealed bid passes the checks of Steps 204 and 206 (i.e., the sealed bid is at least equal to the public reserve price, and the sealed bid exceeds all previous sealed bids submitted by the bidder), then the sealed bid is entered, as in Step 208. If, however, the sealed bid fails at least one of the checks of Steps 204 and 206, the sealed bid is not entered, and the bidder optionally is informed why the sealed bid is defective, as in Step 210.

At expiration of the auction duration, it is determined in Step 212 whether at least two sealed bids have been entered that are at least equal to the public reserve price. If yes, then in Step 214 a high bidder having entered a highest sealed bid is established as the buyer of the auctioned item and wins the auction. The value of the auctioned item is established in Step 214 as the second highest sealed bid, which is the price paid by the buyer for the auctioned item. Optionally, Step 214 may be modified such that the value of the auctioned item is established as one bid increment more than the second highest sealed bid. In this manner, an auctioned item of unknown value is transformed into an auctioned item of known value and buyer.

In the event that at least two unique bidders have independently entered the highest sealed bid at least equal to the public reserve price, the first high bidder to have entered the highest sealed bid is established as the buyer that wins the auctioned item in Step 214. This first high bidder/buyer pays the highest sealed bid (or, optionally, one bid increment more than the highest sealed bid) for the auctioned item, which is established as the auctioned item's value in Step 214. The highest sealed bid (or, optionally, one bid increment more than the highest sealed bid) is established as the value of the auctioned item in this scenario since the highest sealed bid is both the best price and the second-best price submitted for the auctioned item during the SealedSecond™ auction.

If, in Step 212, it is determined that at least two sealed bids at least equal the public reserve price have not been entered, then in Step 216 it is determined whether one sealed bid at least equal to the sealed reserve price has been entered. If no, the auction terminates without a sale, as in Step 218. If yes, it is determined whether the high bidder (the only bidder having entered a sealed bid at least equal to the public reserve price) has opted to pay the public reserve price (or, optionally, one bid increment more than the public reserve price) in this scenario, as in Step 220. If no, the auction terminates without a sale in Step 218. If yes, the high bidder is established as the buyer of the auctioned item that wins the auction, and the value of the auctioned item is established as the public reserve price, as in Step 222. Optionally, Step 222 may be modified such that the value of the auctioned item is established as one bid increment more than the public reserve price. In this manner, an auctioned item of unknown value is transformed into an auctioned item of known value and buyer.

The high bidder's decision whether to accept the public reserve price (or, optionally, one bid increment more than the public reserve price) as the value of the auctioned item in the scenario where the high bidder's sealed bid is the only sealed bid at least equal to the public reserve price may comprise opting in, opting out or being informed. The high bidder's decision may be determined at the time of entry of the high bidder's highest sealed bid (i.e., during the auction at the time of bidding), or may be determined at expiration of the auction duration in the circumstance where the high bidder is the only high bid at least equal to the public reserve price. In one embodiment, when the high bidder's decision is determined at the time of bidding, the decision may be determined for any bidder whose sealed bid is the highest sealed bid at the time when that bidder's sealed bid is entered. In one embodiment, when the high bidder's decision is determined at the time of bidding, the decision may be determined for all bidders at the time of bidding. In one embodiment, when the high bidder's decision is determined at the time of bidding, the decision may be determined for all bidders at the time of bidding until at least one sealed bid at least equal to the public reserve price has been entered.

Figure 2B:
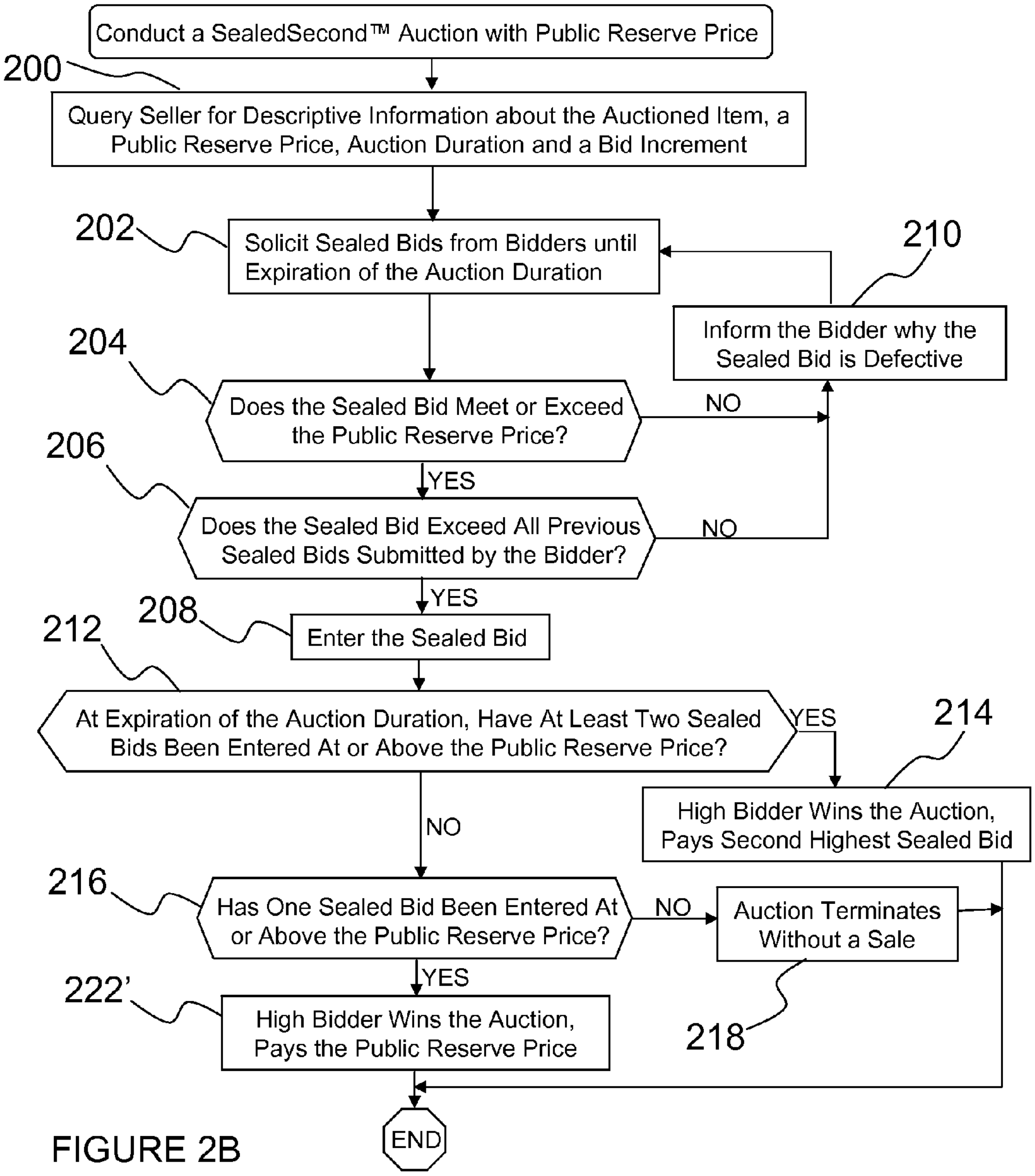

Referring now to FIG. 2B, an alternative embodiment of the SealedSecond™ auction methods of FIG. 2A is provided. In FIG. 2B, Step 220 is omitted. In the scenario where only one sealed bid is entered during the auction that is at least equal to the public reserve price, the public reserve price is automatically established as the value of the auctioned item in Step 222' without actively determining whether the high bidder established as the buyer would accept the public reserve price as the value in that scenario. Optionally, Step 222' may be modified such that the value of the auctioned item is automatically established as one bid increment more than the public reserve price. Preferably, the high bidder is informed that the public reserve price would be the value in that scenario prior to, or during, bidding; the high bidder's continued participation in the auction after being informed may be construed as consent to the public reserve price (or, optionally, one bid increment more than the public reserve price) being the value in that scenario.

With reference to FIG. 3, methods for establishing the value and the buyer for an auctioned item of unknown value via embodiments of a SealedSecond™ auction having a reserve price, either public (i.e., not sealed) or private (i.e., sealed), are described. As seen in Step 300 of FIG. 2A, the seller is queried for descriptive information about the auctioned item, a reserve price for the auctioned item, and whether the reserve price is public or private. The reserve price is the minimum amount that the seller is willing to accept for the auctioned item. The seller optionally also may determine the duration of the SealedSecond™ auction and/or the bid increment. A default auction duration and/or bid increment alternatively may be established. If the reserve price is private, the seller optionally also may set a minimum bid at or below the private reserve price.

After requisite information has been obtained from the seller, sealed bids are solicited from bidders for the duration of the auction, as in Step 302. Bidders and their sealed bids preferably are revealed neither to the seller nor to other bidders during the SealedSecond™ auction. In one embodiment, bidders are not informed during the auction whether any other bidders have met the reserve price. In another embodiment, bidders and prospective bidders are informed whether one, and/or whether at least two, bidders have submitted sealed bids at least equal to the reserve price. Each bidder preferably has the option to increase that bidder's sealed bid at any time for the duration of the SealedSecond™ auction. Once entered, sealed bids preferably cannot be reduced or withdrawn.

When a bidder submits a sealed bid, a series of checks are conducted to determine whether the sealed bid is valid and will be entered. In Step 304, it is determined whether the sealed bid is at least equal to the reserve price and, if specified, the minimum bid. In Step 306, it is determined whether the sealed bid exceeds all previous sealed bids submitted by the bidder.

If a sealed bid passes the checks of Steps 304 and 306 (i.e., the sealed bid is at least equal to the reserve price and, if applicable, the minimum bid, and the sealed bid exceeds all previous sealed bids submitted by the bidder), then the sealed bid is entered, as in Step 308. If, however, the sealed bid fails at least one of the checks of Steps 304 and 306, the sealed bid is not entered, and the bidder optionally is informed why the sealed bid is defective, as in Step 310.

At expiration of the auction duration, it is determined in Step 312 whether at least two sealed bids have been entered that are at least equal to the reserve price. If yes, then in Step 314 a high bidder having entered a highest sealed bid is established as the buyer of the auctioned item and wins the auction. The value of the auctioned item is established in Step 314 as the second highest sealed bid, which is the price paid by the buyer for the auctioned item. Optionally, Step 314 may be modified such that the value of the auctioned item is established as one bid increment more than the second highest sealed bid. In this manner, an auctioned item of unknown value is transformed into an auctioned item of known value and buyer.

In the event that at least two unique bidders have independently entered the highest sealed bid at least equal to the reserve price, the first high bidder to have entered the highest sealed bid is established as the buyer that wins the auctioned item in Step 314. This first high bidder/buyer pays the highest sealed bid for the auctioned item, which is established as the auctioned item's value in Step 314. Optionally, Step 314 may be modified such that the value of the auctioned item is established as one bid increment more than the highest sealed bid. The highest sealed bid (or, optionally, one bid increment more than the highest sealed bid) is established as the value of the auctioned item in this scenario since the highest sealed bid is both the best price and the second-best price submitted for the auctioned item during the SealedSecond™ auction.

If, in Step 312, it is determined that at least two sealed bids at least equal the reserve price have not been entered, then in Step 316 it is determined whether one sealed bid at least equal to the sealed reserve price has been entered. If no, the auction terminates without a sale, as in Step 318. If yes, it is determined whether the high bidder (the only bidder having entered a sealed bid at least equal to the reserve price) has opted to pay the reserve price (or, optionally, one bid increment more than the reserve price) in this scenario, as in Step 320. If no, the auction terminates without a sale in Step 318. If yes, the high bidder is established as the buyer of the auctioned item that wins the auction, and the value of the auctioned item is established as the reserve price, as in Step 322. Optionally, Step 322 may be modified such that the value of the auctioned item is established as one bid increment more than the reserve price. In this manner, an auctioned item of unknown value is transformed into an auctioned item of known value and buyer.

The high bidder's decision whether to accept the reserve price (or, optionally, one bid increment more than the reserve price) as the value of the auctioned item in the scenario where the high bidder's sealed bid is the only sealed bid at least equal to the reserve price may comprise opting in, opting out or being informed. The high bidder's decision may be determined at the time of entry of the high bidder's highest sealed bid (i.e., during the auction at the time of bidding), or may be determined at expiration of the auction duration in the circumstance where the high bidder is the only high bid at least equal to the reserve price.

Figure 3A:
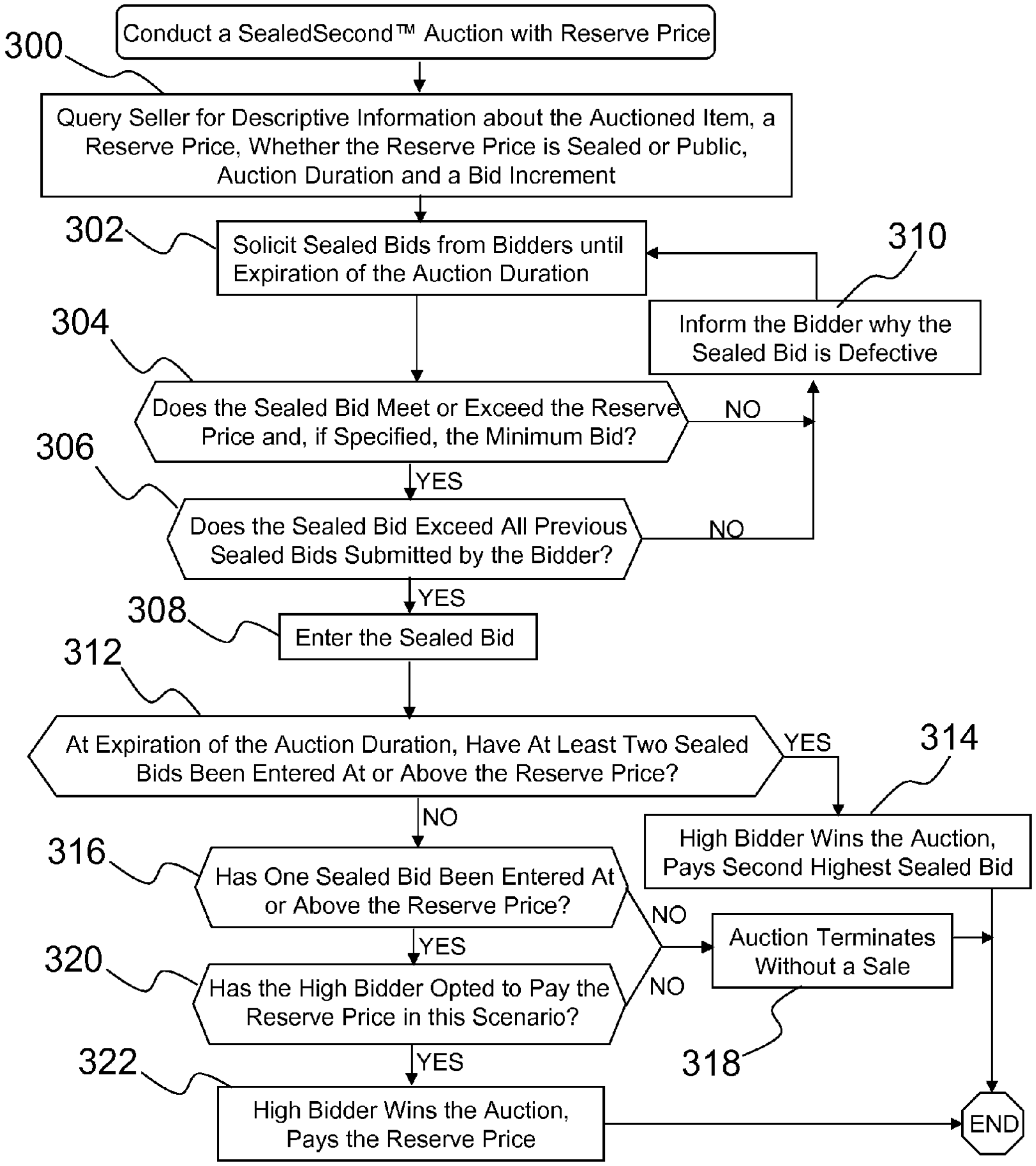
FIGS. 3A-3C are schematic views illustrating methods for establishing the value and the buyer for an auctioned item of unknown value via a SealedSecond™ auction having a reserve price.
Figure 3B:
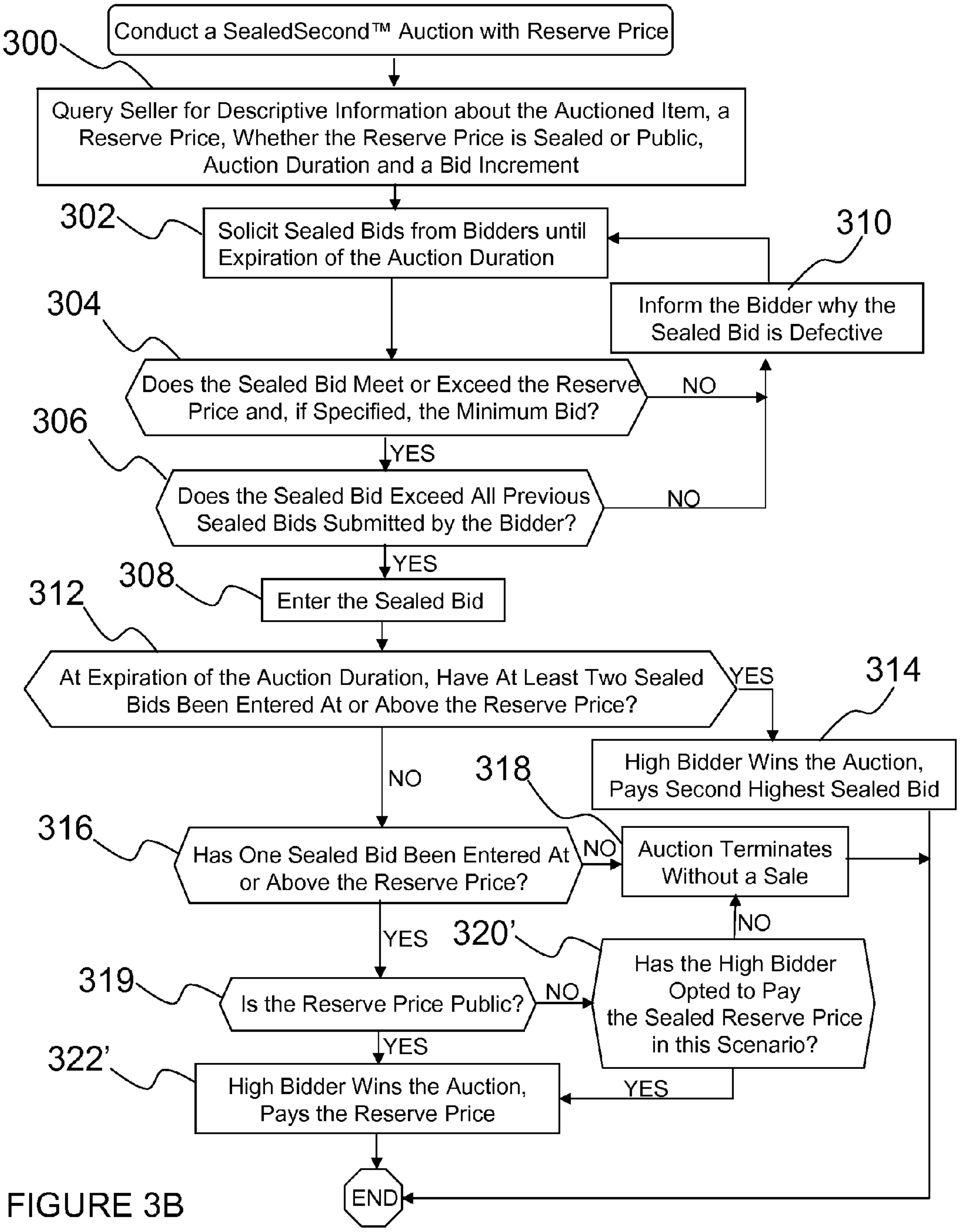

Referring now to FIG. 3B, an alternative embodiment of the SealedSecond™ auction methods of FIG. 3A is provided. In FIG. 3B, if only a single sealed bid is at least equal to the reserve price, it is determined in Step 319 whether the reserve price is public. If no (i.e., if the reserve price is private), then it is determined in Step 320' whether the high bidder has opted to pay the sealed reserve price (or, optionally, one bid increment more than the sealed reserve price) in that scenario. If yes to the determination of either Step 319 or 320', then the high bidder is established as the buyer, and the reserve price is established as the value of the auctioned item in Step 322'. Optionally, Step 322' may be modified such that the value of the auctioned item is established as one bid increment more than the reserve price. If no to the determination of both Step 319 and 320', the auction terminates without a sale in Step 318.

Figure 3C:
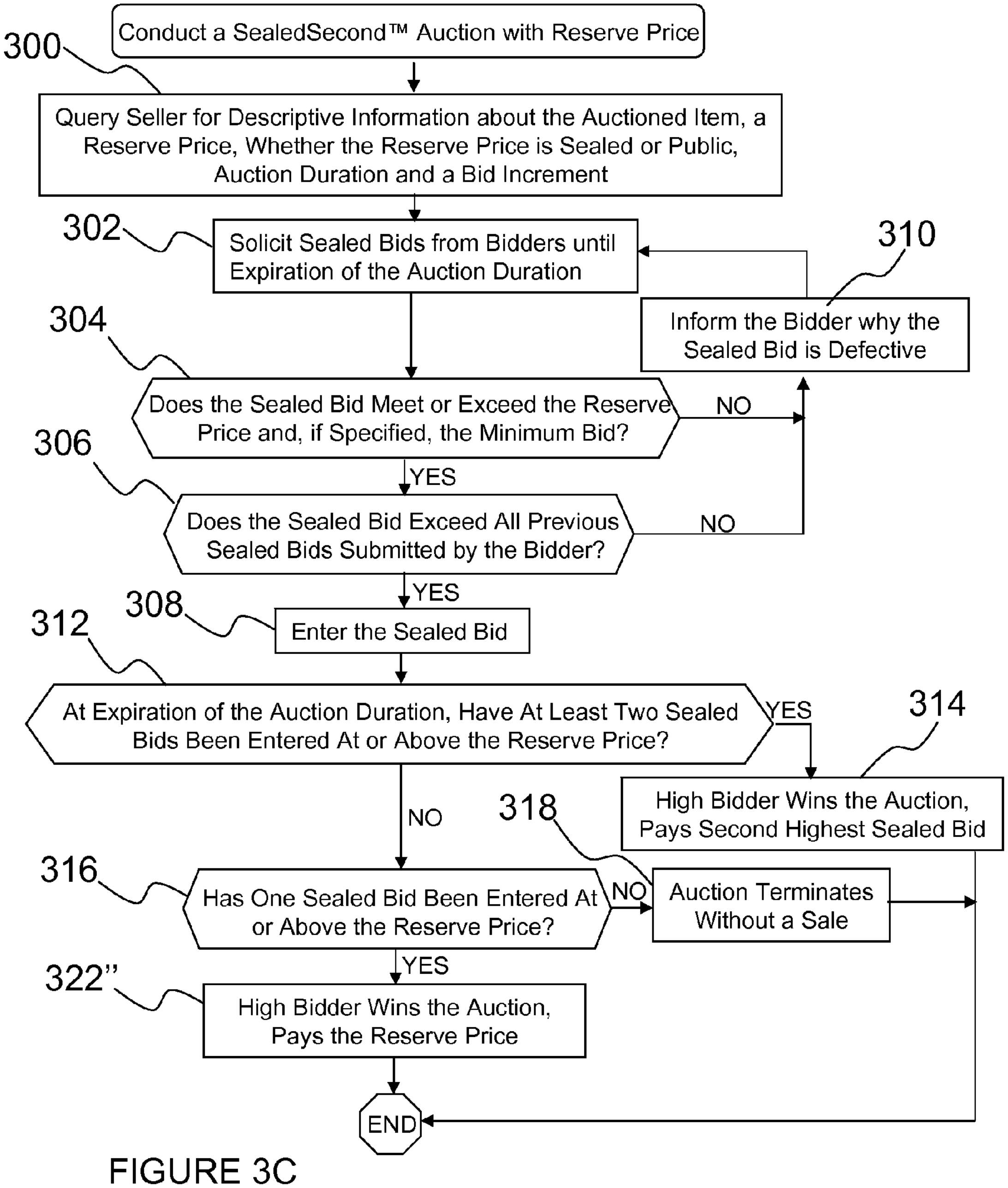

With reference to FIG. 3C, another alternative embodiment of the SealedSecond™ auction methods of FIG. 3A is provided. In FIG. 3C, Step 320 is omitted. In the scenario where only one sealed bid is entered during the auction that is at least equal to the reserve price (or, optionally, one bid increment more than the reserve price), the reserve price is automatically established as the value of the auctioned item in Step 322" without actively determining whether the high bidder established as the buyer would accept the reserve price as the value in that scenario. Optionally, Step 322" may be modified such that the value of the auctioned item is automatically established as one bid increment more than the reserve price. Preferably, the high bidder is informed that the reserve price (or, optionally, one bid increment more than the reserve price) would be the value in that scenario prior to, or during, bidding; the high bidder's continued participation in the auction after being informed may be construed as consent to the reserve price (or, optionally, one bid increment more than the reserve price) being the value in that scenario.

Figure 4:
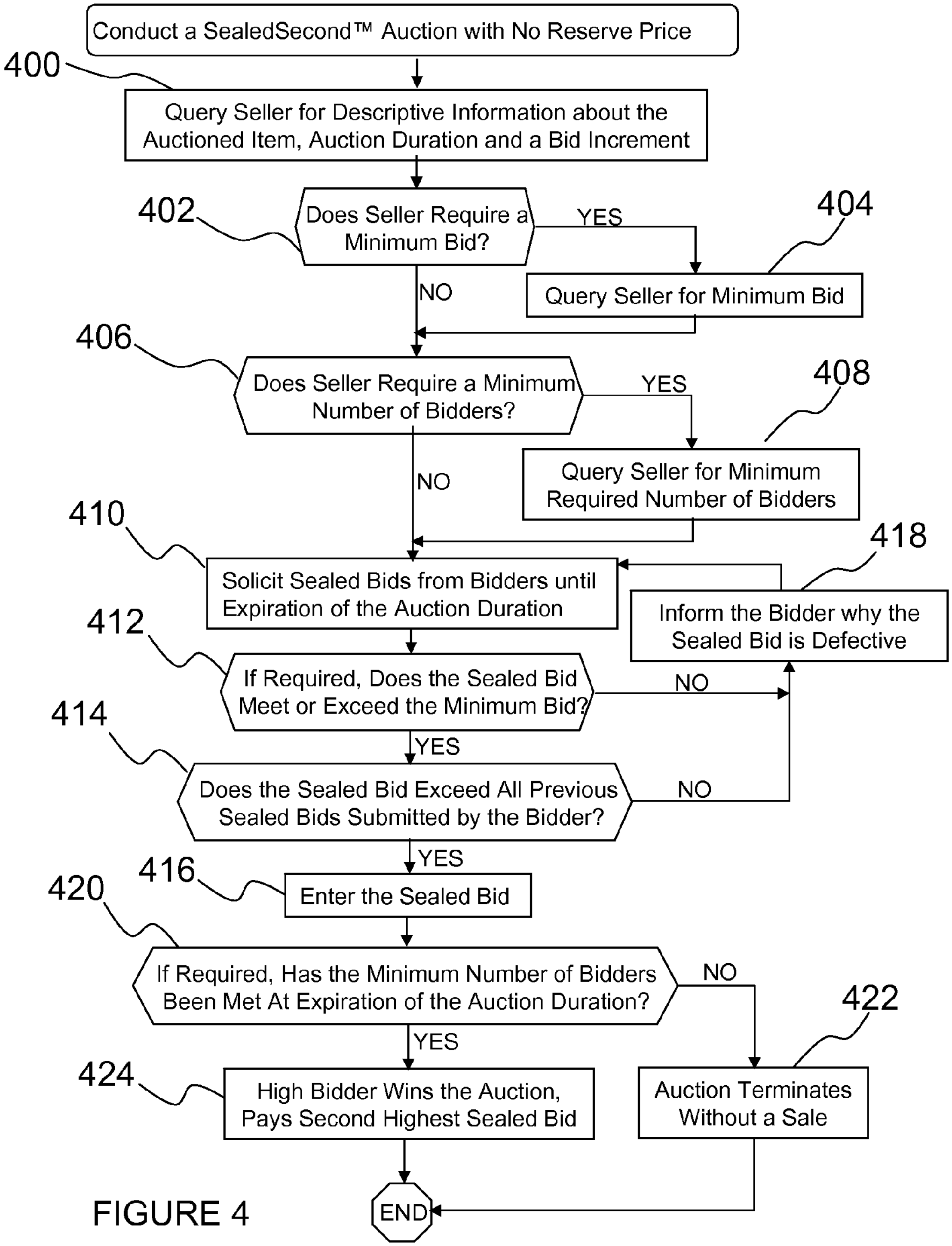
FIG. 4 is a schematic view illustrating methods for establishing the value and the buyer for an auctioned item of unknown value via a SealedSecond™ auction having no reserve price, or a reserve price of zero.

Referring now to FIG. 4, methods for establishing the value and the buyer for an auctioned item of unknown value via a SealedSecond™ auction embodiment having no reserve price, or a reserve price of zero, are described. In Step 400 of FIG. 4, the seller is queried for descriptive information about the auctioned item and, optionally, the auction duration and/or the bid increment. A default auction duration and/or bid increment alternatively may be established.

In the methods described with respect to FIGS. 1 and 3, if the seller specifies a minimum bid, the minimum bid must be no greater than the reserve price. Preferably, in the no reserve SealedSecond™ auction methods of FIG. 4, no minimum bid is allowed, thereby ensuring that the minimum bid is no greater than the zero reserve price. However, the seller optionally may specify a minimum bid that is greater than the reserve price when the reserve price is set to zero, i.e., may specify a minimum bid that is greater than zero (in such an embodiment, the minimum bid is the de facto reserve price). Optional Step 402 of FIG. 4 determines whether the seller requires a minimum bid. If yes, the seller is queried for the minimum bid in optional Step 404.

In SealedSecond™ auctions of the present invention, in lieu of, or in addition to, setting a minimum amount that would be acceptable for the auctioned item via the reserve price, the seller optionally may require a minimum number or bidders for successful completion of the auction in order to increase a likelihood of receiving fair value for the auctioned item. Step 406 determines whether the seller requires a minimum number of bidders. If yes, Step 408 queries the seller for the required minimum number of bidders. Optionally, the minimum number of bidders must be at least two. The minimum number of bidders may be publicly disclosed during or after the auction, or may be kept private. Furthermore, whether the minimum number of bidders has been met may be publicly disclosed during the auction or may be kept private. It should be understood that, while the minimum number of bidders option is being described with respect to no reserve SealedSecond™ auction methods, a minimum number of bidders also optionally may be specified with any of the other SealedSecond™ auction methods of the present invention, including such auction methods having public or private reserve prices.

After requisite information has been obtained from the seller, sealed bids are solicited from bidders for the duration of the auction, as in Step 410. Bidders and their sealed bids preferably are revealed neither to the seller nor to other bidders during the SealedSecond™ auction. In one embodiment, bidders are not informed during the auction whether any other bidders have met the reserve price. In another embodiment, bidders and prospective bidders are informed whether one, and/or whether at least two, bidders have submitted sealed bids at least equal to the reserve price. Each bidder preferably has the option to increase that bidder's sealed bid at any time for the duration of the SealedSecond™ auction. Once entered, sealed bids preferably cannot be reduced or withdrawn.

When a bidder submits a sealed bid, a series of checks are conducted to determine whether the sealed bid is valid and will be entered. In Step 412, if a minimum bid has been specified, it is determined whether the sealed bid is at least equal to the minimum bid. In Step 414, it is determined whether the sealed bid exceeds all previous sealed bids submitted by the bidder.

If a sealed bid passes the checks of Steps 412 and 414, then the sealed bid is entered, as in Step 416. If, however, the sealed bid fails at least one of the checks of Steps 412 and 416, the sealed bid is not entered, and the bidder optionally is informed why the sealed bid is defective, as in Step 418.

At expiration of the auction duration, if the seller has specified a minimum number of bidders, it is determined in Step 420 whether the minimum number of bidders has been met. If no, then in Step 422 the auction terminates without a sale. If yes, then in Step 424 a high bidder having entered a highest sealed bid is established as the buyer of the auctioned item and wins the auction. The value of the auctioned item is established in Step 424 as the second highest sealed bid, which is the price paid by the buyer for the auctioned item. Optionally, Step 424 may be modified such that the value of the auctioned item is established as one bid increment more than the second highest sealed bid. In this manner, an auctioned item of unknown value is transformed into an auctioned item of known value and buyer.

In the event that at least two unique bidders have independently entered the highest sealed bid at least equal to the reserve price, the first high bidder to have entered the highest sealed bid is established as the buyer that wins the auctioned item in Step 424. This first high bidder/buyer pays the highest sealed bid for the auctioned item, which is established as the auctioned item's value in Step 424. Optionally, Step 424 may be modified such that the value of the auctioned item is established as one bid increment more than the highest sealed bid. The highest sealed bid (or, optionally, one bid increment more than the highest sealed bid) is established as the value of the auctioned item in this scenario since the highest sealed bid is both the best price and the second-best price submitted for the auctioned item during the SealedSecond™ auction.

If the seller does not specify a minimum number of bidders in the no reserve auction of FIG. 4, in one embodiment a default minimum number of bidders, such as two independent bidders, may be specified. If less than the default minimum number of bidders is met, then the auction terminates in Step 420 without a sale. In another embodiment, if the seller does not specify a minimum number of bidders but does specify a minimum bid, if only a single sealed bid is entered during the auction, then in Step 424 the high bidder pays the minimum bid (or, optionally, one bid increment more than the minimum bid), which is established as the value of the auctioned item. Optionally, the high bidder must either agree to pay the minimum bid (or, optionally, one bid increment more than the minimum bid) in that scenario or the auction terminates in Step 422 without a sale. In another embodiment, if the seller does not specify a minimum number of bidders and only a single sealed bid is entered during the auction, then the auction terminates without a sale in Step 422.

Figure 5:
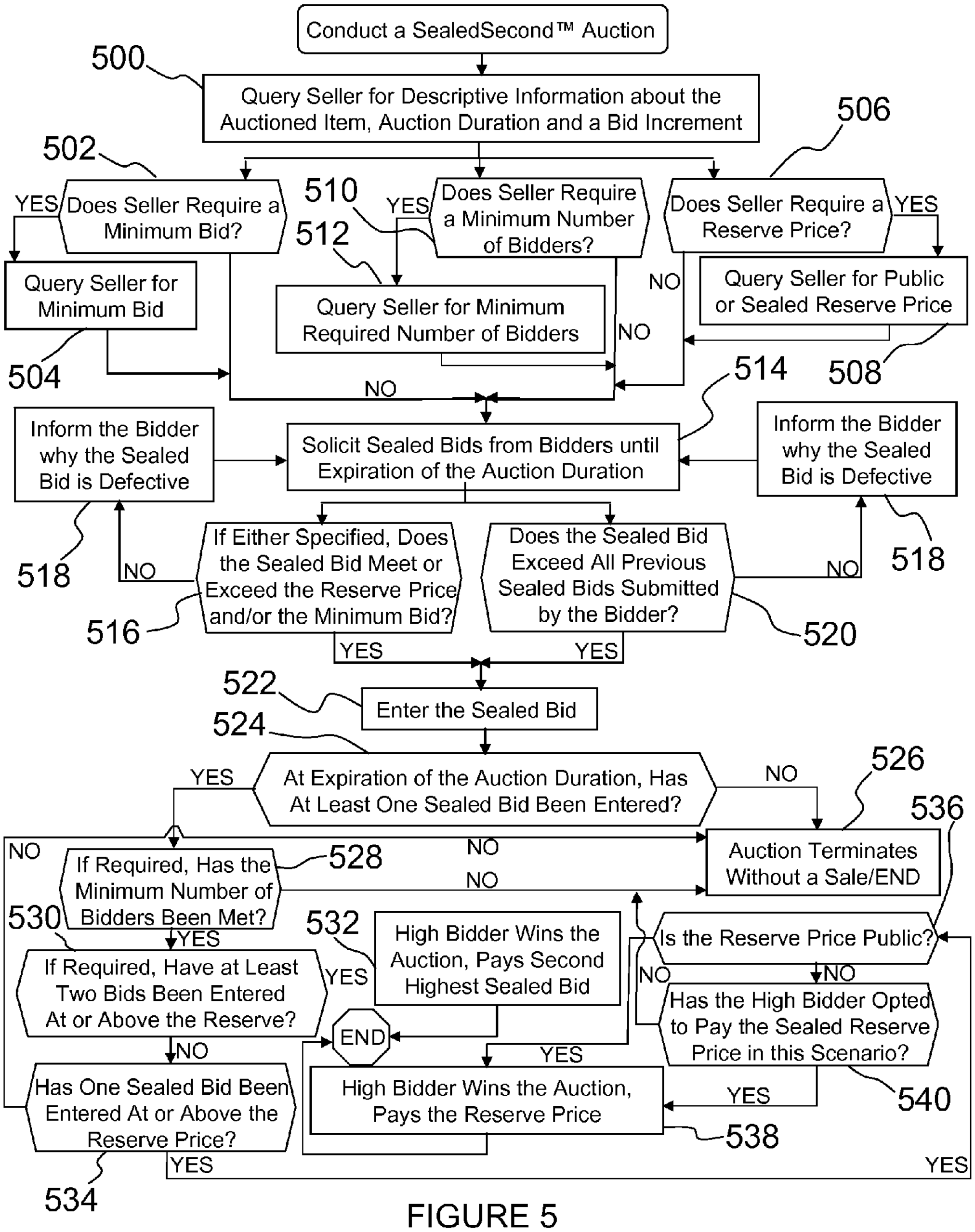
FIG. 5 is a schematic view illustrating methods for establishing the value and the buyer for an auctioned item of unknown value via a SealedSecond™ auction.

Referring now to FIG. 5, additional methods for establishing the value and the buyer for an auctioned item of unknown value via a SealedSecond™ auction are described. In Step 500 of FIG. 5, the seller is queried for descriptive information about the auctioned item and, optionally, the auction duration and/or the bid increment. A default auction duration and/or bid increment alternatively may be established.

In Step 502, it optionally is determined whether the seller requires a minimum bid. If yes, the seller is queried for the minimum bid in Step 504. The minimum bid preferably is no greater than the reserve price, if any. In Step 506, it is determined whether the seller requires a reserve price. If yes, the seller is queried for the reserve price, either public or private, in Step 508. In Step 510, it is determined whether the seller requires a minimum number of bidders, preferably at least equal to two. If yes, the seller is queried for the minimum number of bidders in Step 512.

After requisite information has been obtained from the seller, sealed bids are solicited from bidders for the duration of the auction, as in Step 514. Bidders and their sealed bids preferably are revealed neither to the seller nor to other bidders during the SealedSecond™ auction. In one embodiment, bidders are not informed during the auction whether any other bidders have met the reserve price. In another embodiment, bidders and prospective bidders are informed whether one, and/or whether at least two, bidders have submitted sealed bids at least equal to the reserve price. Each bidder preferably has the option to increase that bidder's sealed bid at any time for the duration of the SealedSecond™ auction. Once entered, sealed bids preferably cannot be reduced or withdrawn.

When a bidder submits a sealed bid, a series of checks are conducted to determine whether the sealed bid is valid and will be entered. In Step 518, if a minimum bid and/or a reserve price have been specified, it is determined whether the sealed bid is at least equal to the minimum bid and/or the reserve price. In Step 520, it is determined whether the sealed bid exceeds all previous sealed bids submitted by the bidder during the auction.

If a sealed bid passes the checks of Steps 516-520, then the sealed bid is entered, as in Step 522. If, however, the sealed bid fails at least one of the checks of Steps 516-520, the sealed bid is not entered, and the bidder optionally is informed why the sealed bid is defective, as in Step 518.

At expiration of the auction duration, in Step 522 it is determined whether at least one sealed bid has been entered during the auction. If no, then the auction terminates without a sale, as in Step 526. If yes, if the seller has specified a minimum number of bidders, it is determined in Step 528 whether the minimum number of bidders has been met. If no, then in Step 526 the auction terminates without a sale. If yes, if a reserve price has been specified, it is determined in Step 530 whether at least two sealed bids at least equal to the reserve price have been entered. If yes, then in Step 532, the high bidder is established as the buyer that wins the auction and pays the second highest sealed bid, which is established as the value of the auctioned item (optionally, Step 532 may be modified such that the value of the auctioned item is established as one bid increment more than the second highest sealed bid). If no, then it is determined in Step 534 whether at least one sealed bid at least equal to the reserve price has been submitted. If no, then the auction terminates without a sale in Step 526. If yes, then it is determined in Step 536 whether the reserve price, if specified, is public or private.

If public, then in Step 538 the high bidder is established as the buyer, and the reserve price is established as the value. If not public, it is determined in Step 540 whether the high bidder has opted to pay the sealed reserve price (or, optionally, one bid increment more than the reserve price) in this scenario. If yes, then in Step 538 the high bidder is established as the buyer that wins the auction, while the reserve price is established as the value of the auctioned item. If no, then the auction terminates without a sale in Step 526. Optionally, Step 538 may be modified such that the value of the auctioned item is established as one bid increment more than the reserve price.

In the event that, when required, a sufficient number of bidders have participated and at least two unique bidders have independently entered the highest sealed bid at least equal to the optional reserve price, the first high bidder to have entered the highest sealed bid is established as the buyer that wins the auctioned item in Step 532. This first high bidder/buyer pays the highest sealed bid for the auctioned item, which is established as the auctioned item's value in Step 530. Optionally, the auctions item's value in Step 530 may be established as one bid increment more than the highest sealed bid. The highest sealed bid (or, optionally, one bid increment more than the highest sealed bid) is established as the value of the auctioned item in this scenario since the highest sealed bid is both the best price and the second-best price submitted for the auctioned item during the SealedSecond™ auction.

At the conclusion of a SealedSecond™ auction, the buyer and the value for the auctioned item preferably are publicly disclosed. If the second highest sealed bid (or, optionally, one bid increment more than the second highest sealed bid) is established as the value, the second highest bidder having entered the second highest sealed bid optionally also may be publicly disclosed at the conclusion of the auction. If the reserve price (or, optionally, one bid increment more than the reserve price) is established as the value, the reserve price optionally may be publicly disclosed at the conclusion of the auction. The highest sealed bid also optionally may be disclosed at the conclusion of the auction. All bidders and their sealed bids, or any subset thereof, optionally may be disclosed at the conclusion of the auction. The number of bidders having entered sealed bids during a SealedSecond™ auction optionally may be publicly disclosed during or after completion of the auction.

Figure 6:
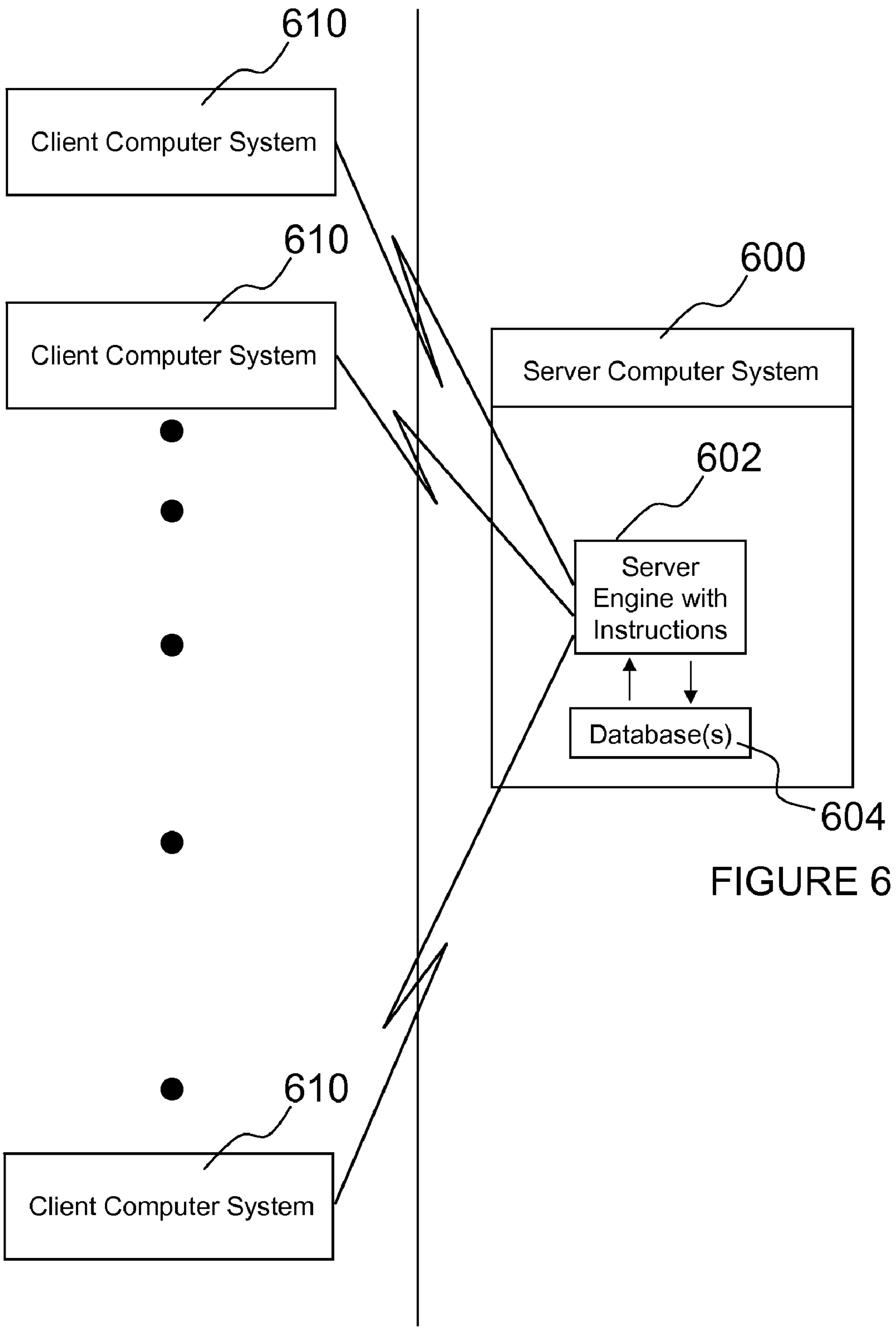
FIG. 6 is a schematic view of a telecommunications network over which a computer-based SealedSecond™ auction may be conducted.

With reference to FIG. 6, auctions may be performed over a telecommunications network, such as the Internet, a public telecommunications network, a private telecommunications network, and/or a Virtual Private Network (VPN), using computer systems. Some auction formats conducted over telecommunications networks may be prone to information asymmetry, the winner's curse, buyer's remorse, bid shading, shill bidding, bid sniping and/or collusion. The perceived or actual relative anonymity provided by the Internet may increase collusion risks, especially in auction formats where bidders and their bids are publicly disclosed during the auction. Collusion may be conducted via bidder signaling in the publicly disclosed bids, or via bidders contacting one another during the auction but outside of the auction framework in order to arrange a collusive side agreement. Furthermore, publicly disclosed bids increase a risk of seller-instigated collusion via, e.g., shill bidder(s) that drop out of an auction after stimulating additional bidding and driving up the high bid for an auctioned item.

SealedSecond™ auctions in accordance with the present invention may be conducted via one or more computers. In FIG. 6, Server Computer System 600 communicates via a telecommunications network, such as the Internet, a public telecommunications network, a private telecommunications network, and/or a Virtual Private Network (VPN), with one or more Client Computer Systems 610. The Server Computer System comprises Server Engine with Instructions 602 for conducting a SealedSecond™ auction, such as any of the SealedSecond™ auction embodiments described previously with respect to FIGS. 1-5, or any other SealedSecond™ auction in accordance with the present invention. The Instructions of Server Engine 602 may include Instructions for accessing and altering Database 604, including reading from and writing to the Database 604. The Instructions may comprise, for example, one or more server-side scripts. Database 604 may comprise, for example, a Relational Database Management System ("RDMS"). FIG. 6 illustratively comprises a single Database 604, but it should be understood that multiple databases optionally may be provided that may be accessed and altered, e.g., via the Instructions of Server Engine 602. Multiple server engines also optionally may be provided for conducting the SealedSecond™ auction.

In one embodiment, the Server Engine 602 of the Server Computer System 600 executes its Instructions to conduct SealedSecond™ auctions. The Server Engine 602 accesses and alters the Database 604, and communicates information to sellers and bidders over the telecommunications network via the Client Computer System(s) 610. Sellers and bidders access SealedSecond™ auctions via the Client Computer System(s) 610. Information from sellers and bidders; such as descriptive information about the auctioned item, the reserve price, minimum bid, sealed bids, whether bidders would accept the reserve price as the value for the auctioned item when a highest sealed bid entered for the auctioned item by a highest sealed bidder is the only sealed bid at least equal to the the reserve price, etc.; are entered into the Client Computer System(s) 610, then communicated to the Server Computer System 600 over the telecommunications network and stored as data in the Database 604 via the Server Engine 602 in accordance with the Instructions. At the conclusion of a SealedSecond™ auction, the Server Engine 602 analyzes the data stored in the Database and establishes the buyer and the value of the auctioned item, or terminates the auction without a sale, in accordance with the Instructions. Although FIG. 6 illustratively shows computer-based SealedSecond™ auctions conducted over a telecommunications network, it should be understood that computer-based SealedSecond™ auctions alternatively may be conducted on a single, stand-alone computer that is accessed, directly or indirectly, by both sellers and bidders.

Although preferred illustrative embodiments of the present invention are described above, it will be apparent to those skilled in the art that various changes and modifications may be made thereto without departing from the invention. It is intended in the appended claims to cover all such changes and modifications that fall within the true spirit and scope of the invention.

What is claimed is:

1. A method for transforming an auctioned item of unknown value and buyer into an auctioned item of known value and buyer, the method comprising:

Setting a reserve price for the auctioned item;

Providing descriptive information about the auctioned item to bidders; and

Conducting a sealed bid auction for the auctioned item,

Wherein conducting a sealed bid auction comprises obtaining sealed bids for the auctioned item from the bidders, Determining, by a server computer, whether a highest bidder accepts the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, and In response to determining that the highest bidder accepts the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, establishing that value as the value and that highest bidder as the buyer for the auctioned item at the conclusion of the sealed bid auction, thereby transforming the auctioned item from unknown value and buyer to known value and buyer; and In response to determining that the highest bidder does not accept the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, terminating the auction without establishing the value and the buyer for the auctioned item.

2. The method of claim 1, wherein establishing the value and the buyer for the auctioned item at the conclusion of the sealed bid auction further comprises, when multiple sealed bids are at least equal to the reserve price, Establishing the highest bidder as the buyer for the auctioned item, and Establishing a second highest sealed bid, or one bid increment more than the second highest sealed bid, as the value for the auctioned item.

3. The method of claim 1, wherein establishing the value and the buyer for the auctioned item at the conclusion of the sealed bid auction further comprises, when the highest sealed bid is the only sealed bid at least equal to the reserve price and the highest bidder accepts the reserve price as the value, Establishing the highest bidder as the buyer for the auctioned item, and Establishing the reserve price, or one bid increment more than the reserve price, as the value for the auctioned item.

4. The method of claim 1, wherein establishing the value and the buyer for the auctioned item at the conclusion of the sealed bid auction further comprises, when the highest sealed bid is the only sealed bid at least equal to the reserve price and the highest bidder does not accept the reserve price as the value, terminating the auction without establishing the value and the buyer for the auctioned item.

5. The method of claim 1, wherein establishing the value and the buyer for the auctioned item at the conclusion of the sealed bid auction further comprises, when no sealed bids are at least equal to the reserve price, terminating the auction without establishing the value and the buyer for the auctioned item.

6. The method of claim 1, wherein establishing the value and the buyer for the auctioned item at the conclusion of the sealed bid auction further comprises, when the highest sealed bid is from multiple independent highest bidders, Establishing a first highest bidder that submitted the highest sealed bid before one or more other independent highest bidders as the buyer for the auctioned item, and Establishing the highest sealed bid, or one bid increment more than the highest sealed bid, as the value for the auctioned item.

7. The method of claim 1, wherein determining whether the highest bidder accepts the reserve price, or one bid increment more than the reserve price, as the value for the auctioned item when the highest sealed bid is the only sealed bid at least equal to the reserve price further comprises determining via a method chosen from the group consisting of the highest bidder opting in to accept the reserve price, the highest bidder opting out to not accept the reserve price, the highest bidder being informed prior to entry of the highest bidder's sealed bid that the reserve price is the value when the highest sealed bid entered for the auctioned item is the only sealed bid at least equal to the reserve price, and combinations thereof.

8. The method of claim 1, wherein setting the reserve price further comprises setting a sealed reserve price.

9. The method of claim 8, wherein conducting the sealed bid auction further comprises privately notifying each bidder during the sealed bid auction when that bidder's sealed bid is less than the sealed reserve price.

10. The method of claim 8, wherein conducting the sealed bid auction further comprises establishing a minimum bid less than or equal to the sealed reserve price for the auctioned item of unknown value.

11. The method of claim 1, wherein setting the reserve price further comprises setting the reserve price equal to zero.

12. The method of claim 1, wherein establishing the value and the buyer for the auctioned item at the conclusion of the sealed bid auction further comprises, Setting a minimum number of independent sealed bids required to establish the value and the buyer for the auctioned item, and Terminating the auction without establishing the value and the buyer when, at the conclusion of the sealed bid auction, the minimum number of sealed bids is not obtained.

13. The method of claim 12, wherein setting the minimum number of independent sealed bids required further comprises publicly disclosing during the sealed bid auction when the minimum number of sealed bids is obtained.

14. The method of claim 1, wherein establishing the value and the buyer for the auctioned item further comprises publicly disclosing the value and the buyer for the auctioned item at the conclusion of the sealed bid auction.

15. The method of claim 14, wherein establishing the value and the buyer for the auctioned item further comprises publicly disclosing all or a subset of the sealed bids obtained at the conclusion of the sealed bid auction.

16. The method of claim 1, wherein conducting the sealed bid auction further comprises conducting the sealed bid auction over a telecommunications network.

17. The method of claim 1 wherein conducting the sealed bid auction further comprises, Providing a computer system having a database and instructions for conducting the sealed bid auction, and Executing the instructions via the computer system to conduct the sealed bid auction, Wherein executing the instructions comprises accessing the database and storing as data in the database the reserve price, the descriptive information, the sealed bids, and whether the highest bidder accepts the reserve price, or one bid increment more than the reserve price, as the value for the auctioned item when the highest sealed bid is the only sealed bid at least equal to the reserve price, and analyzing, at the conclusion of the sealed bid auction, the data stored in the database with the computer system in accordance with the instructions to establish the value and the buyer for the auctioned item.

18. A method for transforming an auctioned item of unknown value and buyer into an auctioned item of known value and buyer, the method comprising:

Providing a computer system having a database and instructions for conducting a sealed bid auction for the auctioned item; and Executing the instructions via the computer system to conduct the sealed bid auction, Wherein executing the instructions comprises accessing the database and storing as data in the database a reserve price for the auctioned item, descriptive information for the auctioned item, and a determination whether a highest bidder accepts the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, and In response to the determination that the highest bidder accepts the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, establishing that value as the value and that highest bidder as the buyer for the auctioned item at the conclusion of the sealed bid auction, thereby transforming the auctioned item from unknown value and buyer to known value and buyer, and In response to the determination that the highest bidder does not accept the reserve price, or one bid increment more than the reserve price, as the value for the auctioned item when a highest sealed bid for the auctioned item obtained from the highest bidder is an only sealed bid at least equal to the reserve price at a conclusion of the sealed bid auction, terminating the auction without establishing the value and the buyer for the auctioned item.

19. The method of claim 18, wherein accessing the database further comprises accessing the database over a telecommunications network.

20. The method of claim 18, wherein storing as data in the database further comprises storing as data in the database whether a highest bidder accepts the reserve price, or one bid increment more than the reserve price, as the value for the auctioned item when a highest sealed bid for the auctioned item obtained from the highest bidder is an only sealed bid at least equal to the reserve price at a conclusion of the sealed bid auction.

* * * * *